United States Patent [19]

Heitmann

[11] 4,298,896
[45] Nov. 3, 1981

[54] FLICKER-FREE REPRODUCTION OF TELEVISION PICTURES FROM RECORDINGS OF ONLY ALTERNATE PICTURE LINES

[75] Inventor: Jürgen Heitmann, Fliederweg, Fed. Rep. of Germany

[73] Assignee: Robert Bosch GmbH, Stuttgart, Fed. Rep. of Germany

[21] Appl. No.: 8,973

[22] Filed: Feb. 2, 1979

Related U.S. Application Data

[63] Continuation of Ser. No. 828,900, Aug. 29, 1977, abandoned.

[51] Int. Cl.$^3$ .............................................. H04N 5/76
[52] U.S. Cl. ........................................ 360/11; 358/8; 360/35
[58] Field of Search ................ 360/11, 7, 36, 9, 10, 360/35, 33; 358/4, 8, 11

[56] References Cited

U.S. PATENT DOCUMENTS

| | | | |
|---|---|---|---|
| 3,359,365 | 12/1967 | Kihara | 360/11 |
| 3,882,539 | 5/1975 | Faroudja | 360/11 |
| 3,886,589 | 5/1975 | Nasu | 360/11 |
| 4,058,840 | 11/1977 | Kasprzak | 360/11 |

FOREIGN PATENT DOCUMENTS 2057908 5/1976 Fed. Rep. of Germany ........ 360/11

Primary Examiner—Alfred H. Eddleman
Attorney, Agent, or Firm—Frishauf, Holtz, Goodman & Woodward

[57] ABSTRACT

The alternate line first picture field of a television picture frame is delayed for one line scan period and the delayed signals are averaged with the currently picked up signals to provide a second field of interpolated lines. Each recorded field is played twice and, for the first playing, a switch actuated at half the vertical scan frequency furnishes the delayed signals to the picture reproducing circuits, while for the second playing of the same field from the record, the averaged signals are supplied to the picture reproduction circuits. For color television signals, only the low-frequency components are processed in the foregoing manner, and the high-frequency components are separated by a frequency dividing network ahead of the delay circuit and added back to the processed low-frequency signals for provision to the picture reproducing circuits.

7 Claims, 3 Drawing Figures

FLICKER-FREE REPRODUCTION OF TELEVISION PICTURES FROM RECORDINGS OF ONLY ALTERNATE PICTURE LINES

This is a continuation of application Ser. No. 828,900, filed Aug. 29, 1977, now abandoned.

This invention relates to a method of reproducing television signals from a record in which there are recorded only one field, made up of alternate lines, of each television picture and in which each such field is played twice in playing back the record.

Since standard television signals display television pictures in a sequence of two "interlaced" fields each made up of alternate lines of the picture, using a small wobble at half the vertical scanning frequency to put the two sets of alternate lines in proper relation to each other, it was recognized some time ago that storage capacity could be saved in television picture recording systems if only one such field of each television picture were recorded, in which case this same field would be played twice in reproducing the picture. The saving of storage space is particularly important for solid record media, but such systems have also been used for reproduction of magnetically recorded televison signals in the so-called still picture reproduction where the same information, obtained from one field, is used for reproducing both fields.

A system for playing back a record by repeated reproduction of each recorded field is disclosed, for example, in radio mentor 7, 1967, p. 527.

The repetition of the signals from a first field containing half of the television picture information in order to provide the lines of the second field of the picture leads nevertheless to disturbing interline flickering.

It is an object of the present invention to provide a method and an apparatus for reproducing all lines of a television picture from the information of only half of the lines of the picture in a single field of an interlaced pattern without the disadvantage of interline flicker.

SUMMARY OF THE INVENTION

Briefly, the object of the invention is accomplished by utilizing an interpolation of signals of successive lines, to provide the second field. The construction of a set of interpolated lines which could, for example, provide a transistion between each two successive lines is as such known, but no circuit or system has been provided heretofore either with interpolated line signals or otherwise for overcoming the interline flicker problem above mentioned. In the method and apparatus of the present invention, the reproduced signals are supplied to a delay circuit that delays them by one line scan period and the resulting delayed signal is then added to the signal currently being reproduced and then the amplitude of the added signal is reduced, in effect reduced by half, to provide the average between each line and the succeeding line. Preferably both the delayed reproduced signals and the average of the delayed and direct signals are continuously available and a switching operation is provided to furnish the delayed signals to the television picture circuits for reproduction of one field and to furnish the average signals to the picture circuits for the reproduction of another field of each pair of fields constituting the reproduction of one picture from the record.

In the case of color television signals, however, a frequency divider network is inserted between the playback pick-up and the delay circuit and only the low-frequency output of the frequency divider network is supplied to the delay circuit and to the addition circuit that provides the averaging operation. The high-frequency output of the frequency divider network, which includes all the color information, is mixed (added) with the low-frequency information selected by the switch operating at half the vertical scan frequency for processing by the television picture reproducing circuits. This is because it has been found that the flicker problem is adequately solved by treating the low-frequency portion of the luminance signal and that the chrominance signal is better left undisturbed by the kind of processing which is desirable for the luminance signal in accordance with the present invention.

The invention is further described by way of illustrative example with reference to the annexed drawings, in which.

Figure 1:
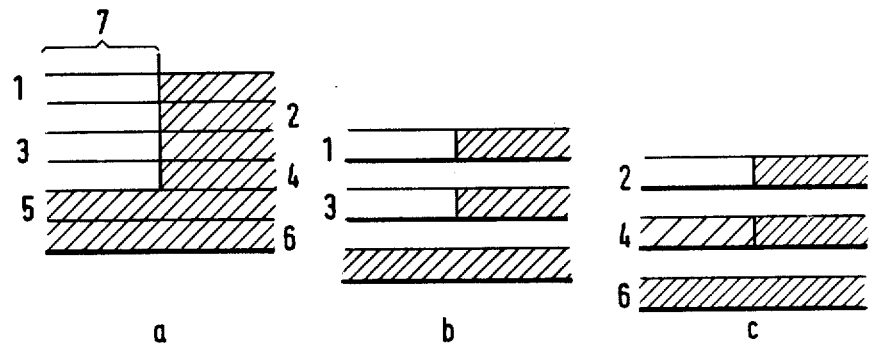
FIG. 1 is a diagram for explaining the relation of the lines of a television picture in a standard television system.
Figure 2:
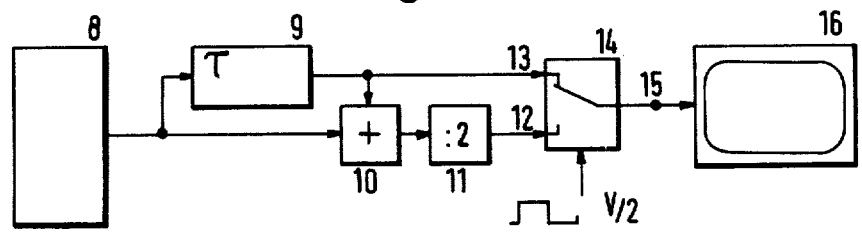
FIG. 2 is a block diagram of an apparatus for practice of the invention suited primarily for reproduction of black and white television pictures from a record.

FIG. 1 is made up of three diagrams, the one at the left showing a portion of a complete television picture, the one in the center separately showing lines 1,3 and 5 of the diagram at the left, and FIG. 2 showing, in principle, the application of the invention to the presentation of lines 2,4 and 6 of the picture. As shown in the portion of the diagram at the left representing the complete television picture, the picture content, by way of example, shows the corner of a bright surface area 7. The remainder of the portion of the television picture shown in the diagram is dark and is therefore represented with the help of diagonal shading lines. In the normal television representation of this portion of a picture, there are alternately displayed lines 1,3 and 5 and lines 2,4 and 6 in accordance with the standard interlaced television picture pattern. Since the field frequency is synchronized to the power frequency, in Europe each line is shown at the repetition rate of 25 Hz, whereas in the United States each line is shown at the repetition rate of 30 Hz. The corresponding field frequencies, since each field shows only alternate lines, are respectively 50 Hz and 60 Hz, the alternating current power frequency.

Since the frequencies of 25 and 30 Hz are both below the flicker limit for the necessary light intensity, the absence of disturbing flicker at sufficiently great observation distance results only because the lines interlaced with each other cannot be resolved quickly enough by the human eye. This effect, that makes possible the use of the low complete picture scan frequencies by utilization of the line interlace system by which the picture is scanned in two interlaced fields, is not effective in the desired degree in the case of horizontal edges. Thus for example the white surface 7 appears to be limited at the bottom by line 3 in the first field (half picture), whereas in the second field of the picture, line 4 appears to be the lower limit of the white area. Consequently, for the observer the edge jumps back and forth visibly in the vertical direction by one line width at a frequency of 25 Hz or 30 Hz. This effect is particularly disturbing if, as described above, in the reproduction of picture signals from records, the content of the first and second fields is identical though relatively shifted by the television picture circuits by one line width in accordance with the standard interlace pattern.

In the middle portion of FIG. 1, lines 1, 3 and 5 are shown each delayed by one line scanning period, and hence deflected downward by two line widths on the television screen by the vertical scanning circuits. According to the invention, for obtaining signals for the second field there is provided an interpolation of the signals of two successive lines of the first field to be interlaced between the lines of the first field by the picture television circuits. In the case of the example illustrated in FIG. 1, this leads to the obtaining of signals for line 4 by interpolation between the signals of lines 3 and 5, thus providing an intermediate value between black and white for the parts of these lines which were white in line 3 and black in line 5, as indicated by the coarse shading of a portion of line 4 in the righthand portion of FIG. 1. Since lines 1 and 3 are identical, line 2 is of course just like them. FIG. 1 also assumes that lines 5 and 7 are identical, so that 6 is the same as they are.

FIG. 2 is a diagram for providing the second field of each picture from the same information content as the first field in accordance with the pattern described in FIG. 1. The record 8 can for example be a solid body record or a magnetic recording, in fact it can be any signal storage device, even a dynamic signal storage device such as a recirculation delay line, so long as a suitable pick-up system is provided for the particular type of storage. The output shown as coming off to the right from the record 8 is the output from a playback pick-up which is assumed to be reading each field of the record twice in succession. It is not material for the purpose of FIG. 2, whether the signals are stored digitally (as by pulse code modulation) or in the now more common analog fashion. Again, all that is important is that the corresponding kind of playback device should be used.

The signals picked up from the record 8 are delayed by the line scan period in the delay device 9. The delayed and undelayed signals picked up from the record 8 are added together in the adding circuit 10. The amplitude of the resulting sum signal is reduced by half in a voltage divider 11, so that the average value of the delayed and undelayed signals is supplied to the first input 12 of the transfer switch 14. The second input 13 of the transfer switch 14 is supplied with the delayed signals as they come out of the delay device 9. The output connection 15 of the transfer switch 14 is alternately connected with the two inputs 13 and 14 of the transfer switch and the control of these alternations of connection is done in response to meander-shaped pulses V/2 having half the vertical scan frequency, so that during the first half-picture field the simply delayed signals are supplied at the switch output 15 and during the second half-picture field, the average value of the delayed and undelayed signals is provided at the switch output 15. The output signals can, for example, be displayed on a monitor 16 or they can be subjected to further processing in known ways in a studio before they are furnished to television picture circuits for display.

The apparatus arrangement of FIG. 2 is particularly suitable for the reproduction of black and white television signals or of the luminance signal in color television, in so far as the latter can be obtained from the record separate from the chrominance signal. Although for black and white television, the system of FIG. 2 results in pictures that are free of the undesirable flicker which it is the object of the present invention to overcome, it has been found that for overcoming the interline flicker it is merely necessary to process the luminance signal of a color television signal in accordance with the invention.

If the record provides a color television signal in the form of an CCVS signal, however, it is not necessary for application of the invention to produce an exact separation between luminance and chrominance signals; it is sufficient, actually, merely to process the low-frequency portion of the luminance signal in accordance with the invention, while the higher frequency portions of the luminance signal and the chrominance signal can be obtained for the second field by simple repetition of the first field without giving rise to any noticeable flicker.

Figure 3:
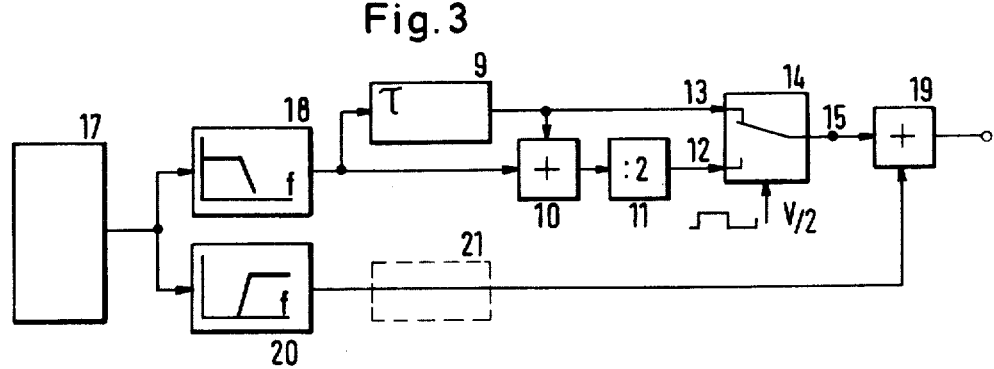
FIG. 3 is a block diagram of an illustrative embodiment of apparatus for practice of the invention for the reproduction of color television pictures from a record.

Such a signal separation can be accomplished simply by a conventional frequency dividing network, with a cross-over frequency preferably at about 2.5 megaherz (NTSC). Such an arrangement is illustrated in FIG. 3, where CCVS color television signals are obtained from the record 17 by an appropriate pick-up (not separately shown) and supplied to the low pass portion 18 of a frequency dividing network 18,20, from which the low-frequency portion of the signal is supplied to the processing circuits 9,10,11,14. At the output 15 of the switch 14, therefore, are provided the low-frequency components of an FBAS color television signal for producing the second field of each picture frame by the interpolation of neighboring lines of the first field. These low-frequency components are then supplied to an addition circuit 19 where the high-frequency components are added (this addition may be regarded as a simple mixing or superposition) and the output of the addition circuit 19 is then supplied to the usual television picture circuits for an FBAS color television signal.

For equalizing the circuit delays of the low-frequency and high-frequency portions of the signal, the high-frequency portions can be likewise delayed by one line scan period by means of a delay circuit 21. The delay circuit 21 is shown in broken lines in FIG. 3, because this delay is of little importance for the color signals since these are of lower resolution. Furthermore, the errors produced by omission of the delay circuit 21 in the high-frequency branch of the processing circuits of FIG. 3 are also so small for the high-frequency portion of the luminance signal that use of a delay equalizer such as the one indicated in broken lines at 21 in FIG. 3 can be completely dispensed with in practice.

Although the invention has been described with reference to illustrative embodiments, it will be understood that variations are possible within the inventive concept. For example, although it is preferred to provide the interpolated lines in the second field of a picture frame, they could in principle be provided in the first field and followed by the simply delayed lines, but of course in that case the interlace wobble of the television circuit would have to be inverted.

I claim:

1. A method of reproducing television signals from a record on which are stored television field signals constituting corresponding halves of two-field interlaced television pictures by reproducing said field signals repeatedly, comprising the steps of:

providing the played back signals to a delay circuit having a delay period of one line scan period;

providing to the inputs of an adding circuit, respectively, the delayed output signal of said delay circuit and the currently reproduced played back signal and thereby forming a signal which is an average of the two, thus representing the average value of the two consecutive lines of the same picture field, and supplying to television picture reproducing circuits in alternate field scan periods, respectively, one of the signals provided to an input of said adding circuit and the average signal formed in the step just previously described.

2. A method of reproducing television signals as defined in claim 1, in which the step of supplying to television picture reproducing circuits in alternating sequence an input signal of said adding circuit and the average signal formed by said adding circuit is controlled by a transfer switch operating at half the vertical scanning frequency of the television signals and having the transfer contact of the switch connected to the input of the television picture circuits and the selection contacts thereof respectively connected to receive one of the input signals provided to said adding circuit and to receive said average signal derived from the output of said adding circuit.

3. A method of reproducing television signals as defined in claim 1, useful for the reproduction of color television signals, in which prior to the step of providing the played back signals to a delay circuit, the played back signals are subjected to a frequency dividing network of which only the low-frequency output is subjected to the method steps of claim 1, whereas the high-frequency components separated by the frequency dividing network are added to the signals supplied to the television picture reproducing circuits by the last step of the method of claim 1.

4. Playback apparatus for reproducing television signals from a record on which are stored corresponding halves of two-field interlaced television pictures, each half being one of said fields, by playing back each recorded field twice in reproducing the record, comprising, in combination:

delay circuit means connected to a source of playback television signals played from said record having a delay period such as to delay the output signals with respect to the input signals by one line scan period;

adding circuit means for adding the playback signals provided to the input of said delay circuit to the signals provided by the output of said delay circuit, said adding circuit means having a first input for receiving said playback signals and a second input for receiving said delay circuit output signals;

means for adjusting the amplitude of the sum signals so as to produce a signal representing the average of the inputs to the adding circuit means, and switching circuit means for connecting the input of television picture reproducing circuits so as to receive alternately the signals provided to one of the inputs of said adding circuit means and the signals produced by said amplitude adjusting means in a switching cycle operating at half the vertical scanning rate of said television picture reproducing circuits.

5. Apparatus for reproducing television signals from a record as defined in claim 4, comprising also a frequency dividing network interposed between said signal source and the input of said delay circuit so as to connect the low-frequency output of the dividing network to the input of said delay circuit, the high-frequency output of said dividing network being connected to a second adding circuit means interposed between said switching means and said television picture reproducing circuits for adding the signal provided by said switching means for said television picture reproducing circuits to said high frequency output of said frequency dividing network.

6. A method of reproducing television signals as defined in claims 1, 2 or 3 in which the signal provided to an input of said adding circuit means which signal is also supplied in alternate field scan periods to said television picture reproducing circuits is said output signal of said delay circuit.

7. Apparatus for reproducing television signals from a record as defined in claim 4 or claim 5 in which an input of said switching circuit means is connected to the output of said delay circuit for the output signal thereof and providing it to the input of said television picture reproducing circuits in alternate scan periods.

* * * * *